United States Patent
Becker et al.

(10) Patent No.: US 6,193,318 B1
(45) Date of Patent: Feb. 27, 2001

(54) SEAT ARRANGEMENT

(75) Inventors: Norbert Becker; Wolfgang Fussnegger, both of Tuebingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/339,876

(22) Filed: Jun. 25, 1999

(30) Foreign Application Priority Data

Jun. 25, 1998 (DE) .............................. 198 28 254

(51) Int. Cl.⁷ .................................................. A47C 7/02
(52) U.S. Cl. ................ 297/452.49; 297/457.53; 297/452.56; 297/452.15; 5/186.1
(58) Field of Search ................ 297/452.49, 452.15, 297/452.54, 452.56, 452.53; 5/186.1

(56) References Cited

U.S. PATENT DOCUMENTS

| 2,217,893 | * | 10/1940 | Dunajeff | 297/452.54 |
| 2,892,489 | * | 6/1959 | Hurley | 297/452.15 |
| 4,555,140 | * | 11/1985 | Nemoto | 297/452.54 |
| 5,747,140 | * | 5/1998 | Heerklotz | 297/452.56 |

FOREIGN PATENT DOCUMENTS

| 2209744 | 9/1972 | (DE) . |
| 2400119A1 | 7/1975 | (DE) . |
| 3515631A1 | 11/1985 | (DE) . |
| 4341070A1 | 6/1995 | (DE) . |

* cited by examiner

*Primary Examiner*—Anthony D. Barfield
(74) *Attorney, Agent, or Firm*—Evenson, McKeown, Edwards & Lenahan, P.L.L.C.

(57) ABSTRACT

A sitting and/or lying arrangement, particularly a vehicle seat or airplane seat, has a stable subframe and a flexible support which has a base part and a cushion. For creating such an arrangement, in which the user's body is anatomically correctly supported such that the body can relax and no pressure points are formed, the base part consists of a transversely stiff but longitudinally flexible material and is implemented, for example, by a thin, corrugated spring plate made of spring steel, carbon fibers, glass fibers or kevlar fibers, titanium and the like.

36 Claims, 6 Drawing Sheets

SEAT ARRANGEMENT

BACKGROUND AND SUMMARY OF THE INVENTION

This application claims the priority of German application 198 28 254.0, filed Jun. 25, 1998 in Germany, the disclosure of which is expressly incorporated by reference herein.

The invention relates to a sitting and/or lying arrangement, particularly a seat such as a vehicle seat or airplane seat of the type having a stable subframe comprising a seat frame of a seat part and a backrest frame of a backrest connected therewith, and having a base part which has a transversely stiff and longitudinally flexible construction,.

In the case of a known seat for vehicles or the like (German Patent Document DE 22 09 744 A1), the subframe has a forward, a rearward and two lateral frame parts, and a flexible or elastic base plate or bottom plate is connected to one or several of these frame parts, while it is separated from all the other parts of the frame and is connected with these by way of elastic elements, such as coil springs. In one embodiment of this seat, the elastic elements are constructed as corrugated and therefore correspondingly flexible sections of the bottom plate, so that a downward directed pressure admission as the result of the sitting person's weight causes a pressing-down of the two flexible sections and a deflection of the bottom plate in the downward direction. The cushion, which is made, for example, of foamed urethane rubber, is mounted on the frame, the frame and the cushion being covered by means of a casing made, for example, of vinyl leather.

Such a seat has the disadvantage that the cushion is too thick and will wear out after being subjected to a prolonged load. A proper resistance to the anatomic structure of the body required for a correct sitting is not ensured. One also does not sit in a two-point sitting position on the ischial tuberosities, which exist for this purpose, but slides onto the tip of the coccyx and sits in a so-called three-point sitting position, which is extremely uncomfortable. The result is the constant desire to change the body position in the seat, which, in the case of an automobile seat, may result in the lack of attention to traffic, a feeling of uneasiness and rapid fatigue as well as irritability. In the case of an airplane seat, this leads to a disturbing sitting sensation, pain in the area of the spinal column and to a lack of sleep during long flights so that the body cannot rest during the flight and considerable fatigue occurs at the destination. In the case of sick persons with, for example, neuropathic changes, such a three-point sitting position may result in a pressure sore; in the case of wounds of other origins, for example burns, it may result in wound healing impairments.

In the case of a known backrest with a backrest frame, a cushion and a back shell for a motor vehicle seat (German Patent Document DE 35 15 631 A1), a simple construction with a low installation depth is achieved in that the back shell covered toward the front by the cushion has an elastic transition area used for the fastening on the backrest frame and an elastic transition area which follows toward the flat center part, which transition area preferably has a profile which has a corrugated cross-section and permits a resilient movement of the center part perpendicularly to the main plane of the backrest.

In the case of a known sitting or lying arrangement of the initially mentioned type (German Patent Document DE 24 00 119 A1), the base part fastened by means of its forward and rearward end on the seat frame is a mat made of a resilient material which is essentially non-ductile per se, such as spring steel plate, which obtains its flexibility in the longitudinal direction by extensional corrugations which are made transversely to the longitudinal direction and at an equal distance from one another. The extensional corrugations have a V-shaped or U-shaped profile and are shaped in one piece out of the spring plate in such a manner that their V- or U-openings point upwards. When the mat is loaded by a sitting person, the opening width of the extensional corrugations is enlarged and therefore permits an extension of the mat in the longitudinal direction. Another mat is mounted in the backrest frame, in which case end edges of the mat extending in parallel to the extensional corrugations are fixed on the two vertically extending spans of the backrest frame.

It is an object of the invention to construct a sitting and/or lying arrangement of the initially mentioned type in the case of which the user's body is supported in an anatomically correct manner such that the body can relax and no pressure points occur.

According to the invention, this object is achieved by providing an arrangement of the above referred to general type, wherein the base part is formed of a thin corrugated spring plate whose corrugations extend transversely and spaced from one another in a longitudinal corrugation direction of the seat, and which is suspended by means of a forward end edge, which extends transversely, on a forward cross strut of the seat frame and is suspended by means of a rearward end edge, which extends transversely, on an upper transverse spar of the backrest frame, and wherein a cushion rests on the corrugated spring plate, which cushion is divided into a section forming a seat cushion and into a section forming a backrest cushion.

The sitting and/or lying arrangement according to the invention has the advantage that the base part made of a transversely stiff but longitudinally flexible material, such as spring steel, carbon fibers, glass fibers or kevlar fibers, titanium or the like, ensures an anatomically correct sitting with a hollow and therefore less stressed sacrococcygeal region and an axially stressed ischial tuberosity region, and simultaneously a base structure for the cushion adapting to the body is provided which, although it has a certain stiffness, can be continuously changed and adapted to the momentary sitting wishes; thus, for example, when a tired sitting person who is slumped forward slides to the front. The transversely stiff and longitudinally flexible base part will then adjust itself such that the ischial tuberosities axially load the base part. The cushion, which corresponds to the anatomical requirements and cushions the pressure isobars of the body during the sitting in different positions, is pulled onto this hard transversely stable but longitudinally flexible base structure. The longitudinally flexible but stiff base part can be placed into the cushion, can be suspended on the subframe, can be adjusted and/or can be sprung as a whole. By means of additional mechanisms, which are mounted on the suspension of the base part on the subframe, the arching can be adjusted in the area of the longitudinal flexibility and can be adapted to the momentarily desired sitting position. The cushion may consist of foam, of rubberized hair, of a breathing material, of a perforated silicone cover, of air chambers or the like. On the whole, the sitting and/or lying arrangement combines the positive characteristics of the anatomic seat design with the positive elements of the individual readjustability, in which case as little material as possible and as much material as necessary is used.

Other objects, advantages and novel features of the present invention will become apparent from the following detailed description of the invention when considered in conjunction with the accompanying drawings.

DETAILED DESCRIPTION OF THE DRAWINGS

Figure 1:
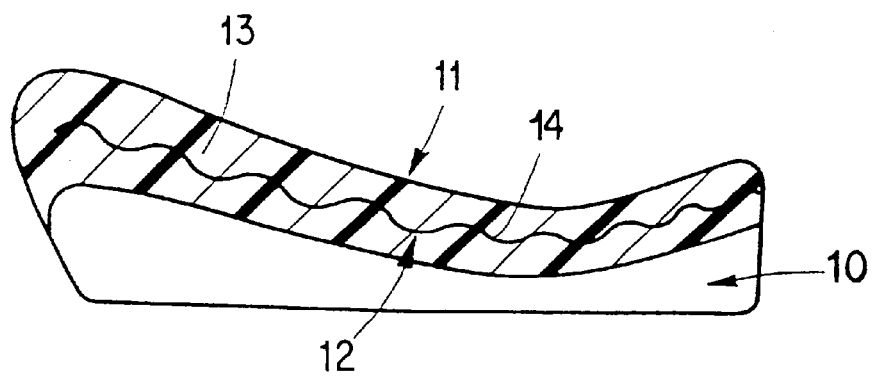
FIG. 1 is a schematic longitudinal sectional view of a seat part of a vehicle seat constructed according to an embodiment of the present invention.

In the drawings, similar reference numbers with respective different letter suffices "A, B - - - " are used to designate generally similar functioning structures in the respective different embodiments illustrated. Unless otherwise indicated in the following description, the description of the structures with similar reference numbers, but with no or different letter suffices, should be referred to.

Figure 2:
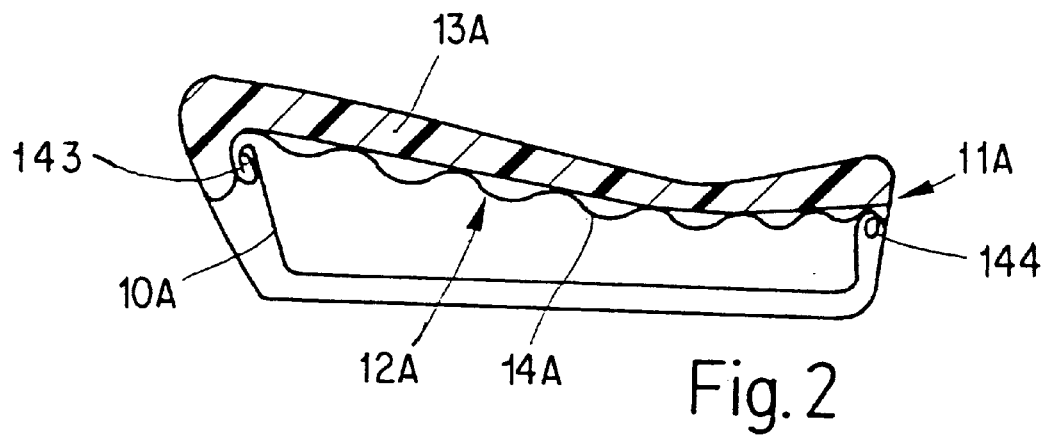
FIG. 2 is a schematic longitudinal sectional view of a seat part according to another embodiment of the present invention.

The two seat parts of a vehicle seat, which are schematically shown in FIGS. 1 and 2 as longitudinal sectional views as an example of a general sitting and/or lying arrangement. The sitting and/or lying arrangements contemplated by the invention include an airplane seat having a backrest which can be tilted toward the rear for the purpose of relaxation, an orthopaedic seat or an orthopaedic lounger, a wheelchair and the like, each having a stable subframe 10, 10A and a flexible support 11, 11A which is composed of a base part 12, 12A and a cushion 13, 13A. The base part 12A has a transversely stiff and longitudinally flexible construction and is formed in the embodiments shown of a thin corrugated spring plate 14, 14A whose wave height and material thickness depend on the material selection and load. The term "spring plate" is used in the following as a synonym for a thin flexible plate or foil and does not characterize the material of the thin plate or foil. Spring steel, carbon fibers, glass fibers or kevlar fibers or titanium can be used as the material for the corrugated spring plate.

Figure 3:
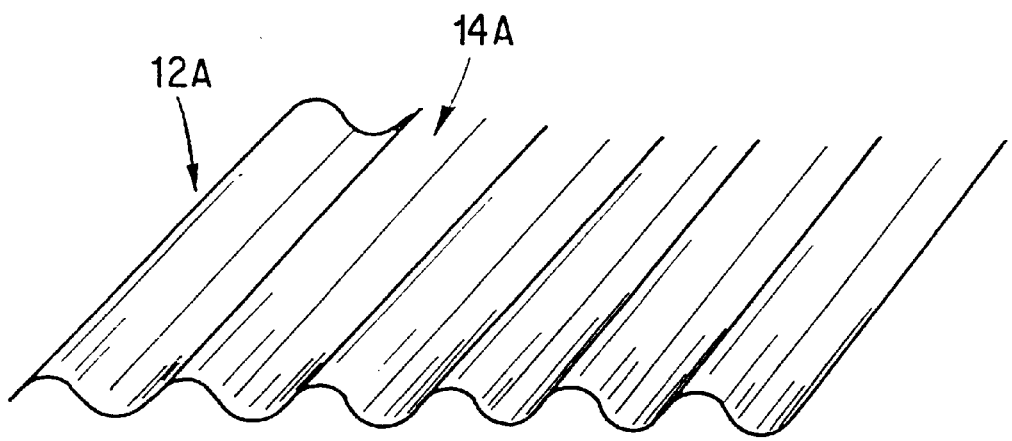
FIG. 3 is a schematic cutout view of a base part of the seat parts according to FIGS. 1 or 2.

FIG. 3 is a perspective cutout of the base part 12, 12A constructed as a corrugated spring plate 14, 14A. In this case, the profile of the corrugation has a sinusoidal construction.

Figure 5:
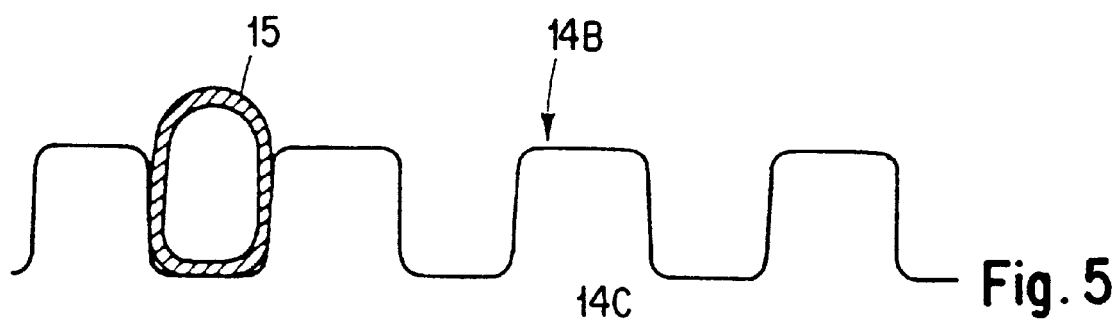
FIGS. 5 to 7 are schematic cutouts respectively of a longitudinal section of a base part in the seat according to FIGS. 1 or 2 in three different embodiments.
Figure 6:
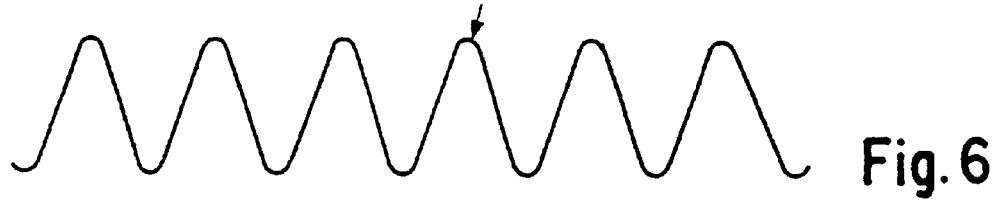
Figure 7:
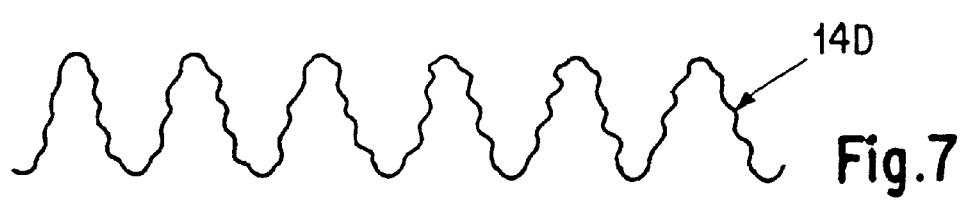

FIGS. 5, 6 and 7 show additional examples of the wave profile of the corrugated spring plate 14, 14B, 14C, 14D. In FIG. 5, the wave profile of the plate 14B has a rectangular shape; in FIG. 6 the wave profile of the plate 14C is triangular with rounded vertexes; and in FIG. 7, a second corrugation with a significantly smaller corrugation period is superimposed on the triangular wave profile of the plate 14D. As illustrated in FIG. 5, air-filled hoses 15 can also be placed in the wave troughs 141 of the corrugated spring plate 14, as viewed from the direction of the cushion 13, 13A.

In the embodiment of FIG. 1, the corrugated spring plate 14 is embedded within the cushion 13 and the cushion 13 is connected with the subframe 10. In this case, the cushion 13 is preferably constructed as a core made of a foamed material which encloses the corrugated spring plate 14, the corrugated spring plate being perforated in order to permit the foaming-in.

In the embodiment of FIG. 2, the corrugated spring plate 14A is suspended at its end edges 143, 144, which extend transversely to the corrugation, on the subframe 10A, and the cushion 13 rests directly on the corrugated spring plate 14A. In addition—as illustrated only in FIGS. 13 and 4D—the corrugated spring plate 14, 14A may be fastened at its longitudinal edges 145 extending in parallel to the corrugation by means of spring-elastic elements, preferably tension springs 16, on a subframe 10, 10A, or on cap 31 in the FIG. 13 embodiment as further described below.

Figure 4A:
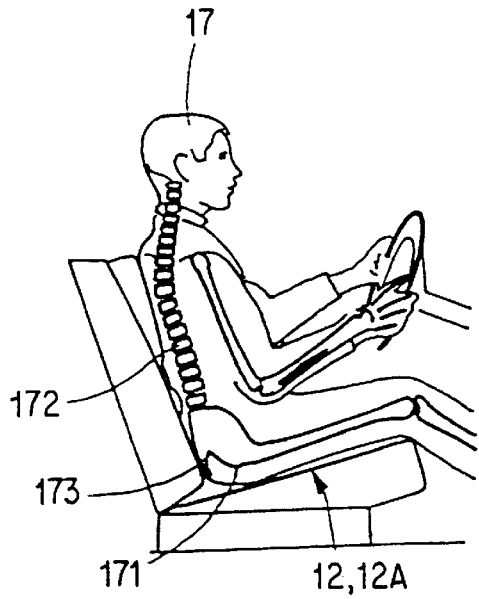
FIGS. 4A and 4B respectively are schematic lateral views of a seat with a sitting person for demonstrating the function of the seat according to FIGS. 1 or 2 in two different sitting postures of the sitting person.
Figure 4B:
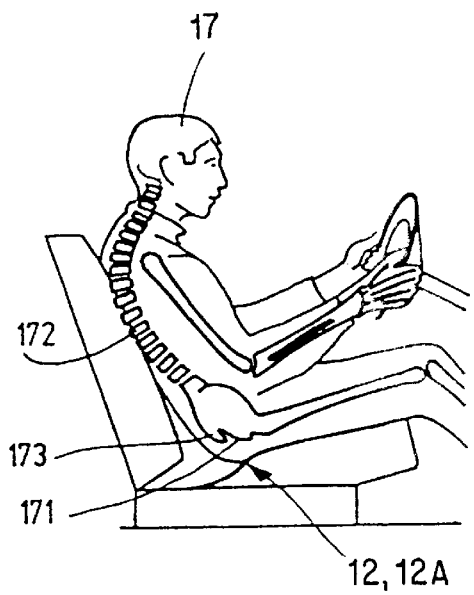

FIGS. 4A, 4B, 4C and 4D schematically show the displacement of the base part 12, 12A in the seat part according to FIG. 4A or 4B when a sitting person 17 loads the seat in two different sitting positions. In both sitting positions, the stressing of the ischial tuberosities 171 is orthopedically correct (not the sitting position). The pressure acts from below axially upon the ischial tuberosities 171 of the sitting person 17, and the hollow placement of the sacrococcygeal region 173 is ensured.

Figure 4C:
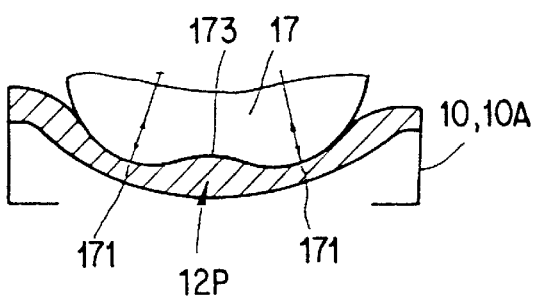
FIG. 4C is a schematic cutout of a cross-section of the seat in FIGS. 4A and 4B occupied by a sitting person.
Figure 4D:
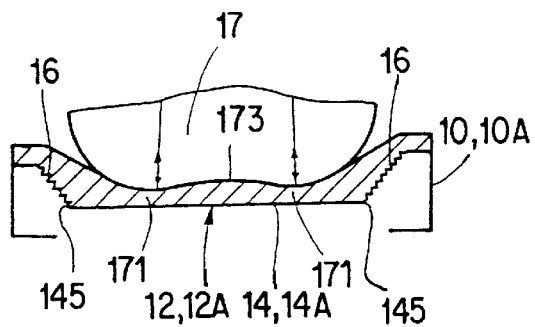
FIG. 4D is the same schematic representation as in FIG. 4C of a conventional standard seat.

FIGS. 4C and 4D also schematically show the displacement of the base part 12, 12A in the seat part when the seat is loaded by a sitting person 17. In FIG. 4D, the pressure is applied from below vertically onto the ischial tuberosities 171 of the sitting person 17. In contrast, in the case of the seat part of a conventional vehicle seat outlined in FIG. 4C, the base plate 12P arches through more in the center because it is not transversely stiff as in the case of the seat according to 4D, and the pressure is not applied vertically but diagonally from below to the ischial tuberosities 171. The sitting person 17 feels closed in and notices pressure loads on the lateral pelvis. In the case of the seat 4D with the pulled-in corrugated spring plate 14, 14A as the result of the transverse stiffening of the corrugations, a hanging-through in the center is prevented and, by means of its longitudinal flexibility, a cushioning is guarantied and an adaption to the sitting position is ensured. Which of the wave profiles illustrated in FIGS. 3 and 5 to 7 is used in the case of the corrugated spring plate 14, 14A, 14B, 14C, 14D depends on the cushioning characteristic of the material and the stress to which the seat is subjected. The inserted, air-filled hoses 15 shown in FIG. 5 take over, for example, a massaging function.

In FIG. 4A, the sitting person is sitting upright and attentive. He is supported by means of the ischial tuberosities 171. The spinal column 172 is supported on the backrest 21. In FIG. 4B, the sitting person is tired, slumping and slides toward the front. In the case of a standard seat, this would result in pressure on the sacrococcygeal region which is uncomfortable and results in complaints and uneasiness. In contrast, in the case of the new type of seat introduced here, the base part automatically adjusts itself such that the ischial tuberosities are again axially loaded.

Figures 8A, 8B:
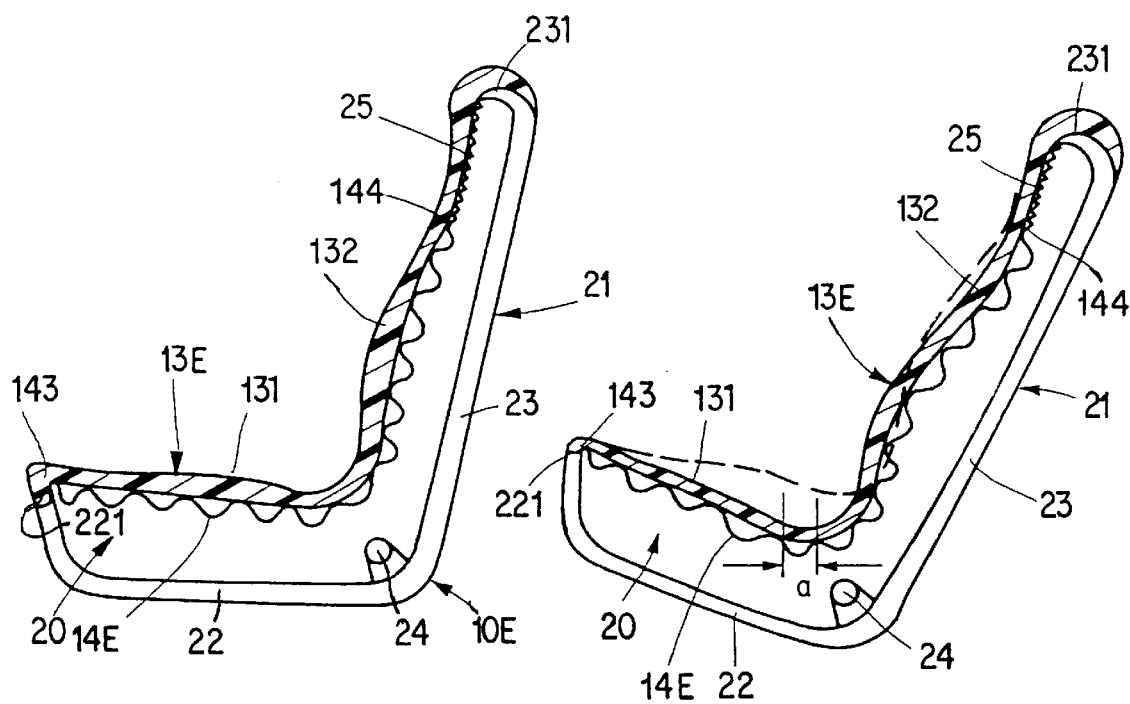
FIG. 8 is a schematic longitudinal sectional view respectively of a vehicle seat constructed according to preferred embodiments of the invention, showing a seat part and a backrest in the driving position in FIG. 8A and in a tilted rest position in FIG. 8B.

FIGS. 8A and 8B are schematic longitudinal sectional views of a vehicle seat with a seat part 20 and a backrest. The subframe 10E consists of a seat frame 22 of the seat part 20 and of a backrest frame 23 of the backrest 21 which are rigidly connected with one another. As an alternative, the backrest frame can also be swivellably fixed on the seat frame in order to be able to be changed into a lying arrangement used for relaxation. The whole subframe 10E can be tilted about a tilting axis 24 extending transversely to the sitting direction and can be swivelled from a so-called driving position (FIG. 8A) into a resting position (FIG. 8b) used for relaxation. By means of its forward end edge 143 extending transversely to the corrugation, the corrugated spring plate 14E is suspended on a forward cross strut 221 of the seat frame 22 and, by means of its rearward end edge 144 extending transversely to the corrugation, it is suspended by means of spring elements 25 on an upper transverse spar 231 of the backrest frame 23. In the embodiment of FIGS. 8A and 8B, the spring elements 25 can also be eliminated and the corrugated spring plate 14E can be fixed by means of its end edge 144 directly on the upper transverse spar 231, as in the embodiments of FIGS. 10 and 11. The cushion 13E covers the corrugated spring plate 14E in one piece and, by means of its forward section, forms the seat cushion 131 and by means of its rearward section, forms the backrest cushion 132. When the vehicle seat is swivelled into the resting position, the pelvis is displaced toward the front by the amount "a" in FIG. 8B. The corrugated spring plate 14E goes along with the changed sitting position so that the sitting person sits again in an orthopedically correct manner. The change of the position of the corrugated spring plate 14E and of the cushion 13E is illustrated in FIG. 8B, the contour shown by a broken line illustrating the course of the cushion surface when the seat is in the driving position according to FIG. 8A.

Figure 9:
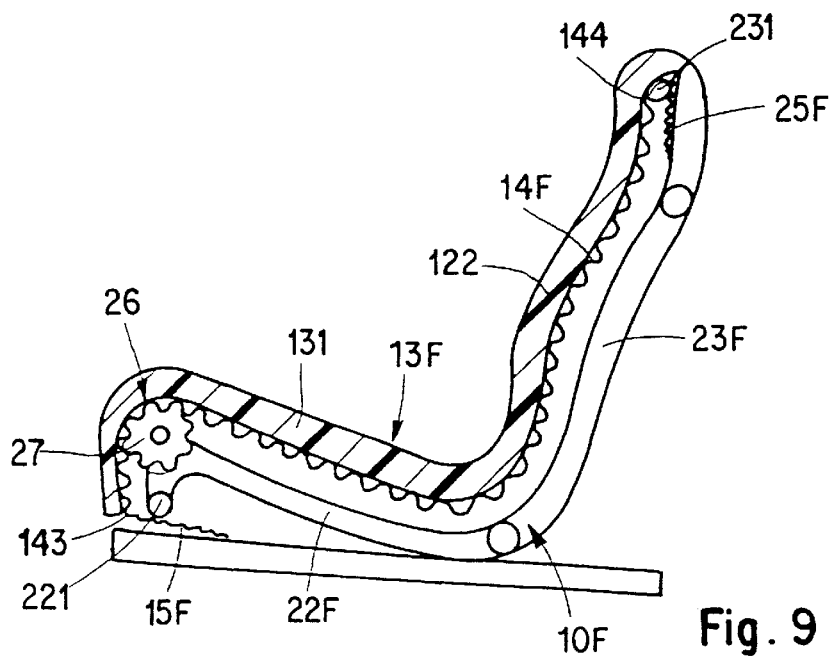
FIGS. 9 to 11 are schematic longitudinal sectional views respectively of a vehicle seat according to three additional embodiments of the invention.

In another embodiment of a vehicle seat with a seat part and a backrest, which is outlined in a longitudinal sectional view in FIG. 9, the subframe 10F is again composed in one piece of the seat frame 22F and the backrest frame 23F, and the corrugated spring plate 14F is fixed by means of its end edges 143, 144 by way of spring elements 25F on the forward cross strut 221 of the seat frame 22F and on the upper transverse spar 231 of the backrest frame 23F. The cushion 13F with its sections forming the seat cushion 131 and the backrest cushion 132 rests directly on the corrugated spring plate 14F. For adjusting the depth of the seat, an adjusting arrangement 26 is assigned to the corrugated spring plate 14F by means of which adjusting arrangement 26 the corrugated spring plate 14F is longitudinally displaceable, that is, displaceable in the direction of the corrugation. The adjusting arrangement 26 has a driving roller 27 which is arranged on the or close to the forward cross strut 221 of the seat frame 22F and extends transversely over the corrugated spring plate 14F, which driving roller 27 engages by means of a cam profile adapted to the wave profile in the corrugated spring plate 14F. The corrugated spring plate 14F is guided around the driving roller 27 so that a sufficient section of the corrugated spring plate 14F engages with the cam profile of the driving roller 27. When the driving roller 17 is rotated into one or the other rotating direction, the corrugated spring plate 14F is displaced into one or the other direction while stretching one or the other spring element 25F and the depth of the seat is thereby shorted or lengthened.

Figure 10:
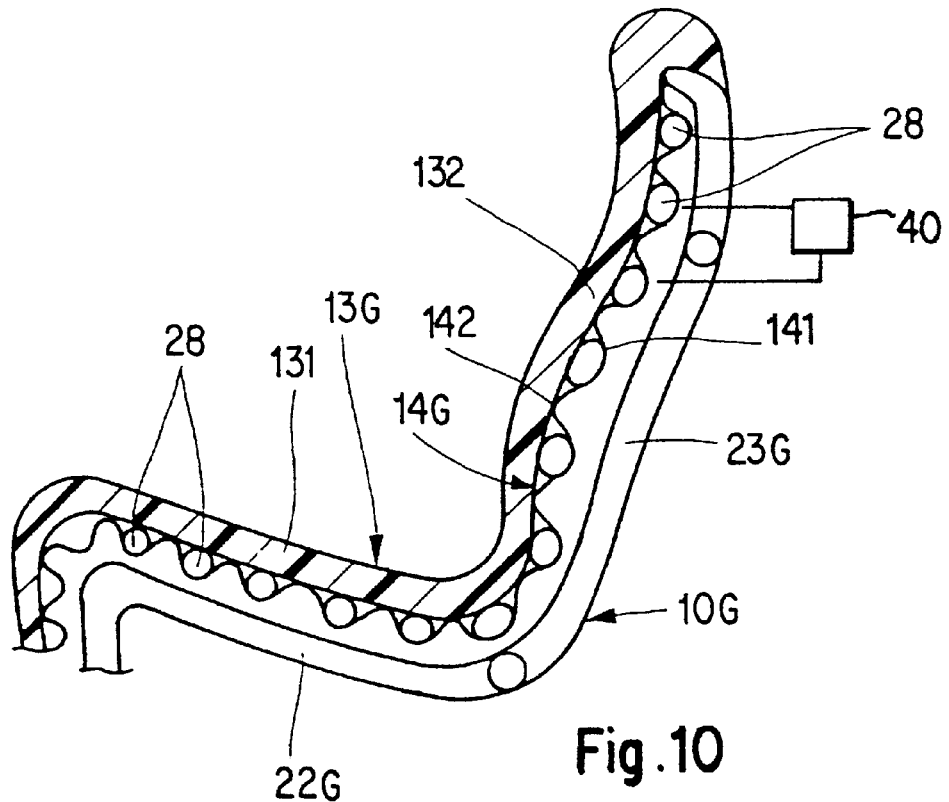
Figure 11:
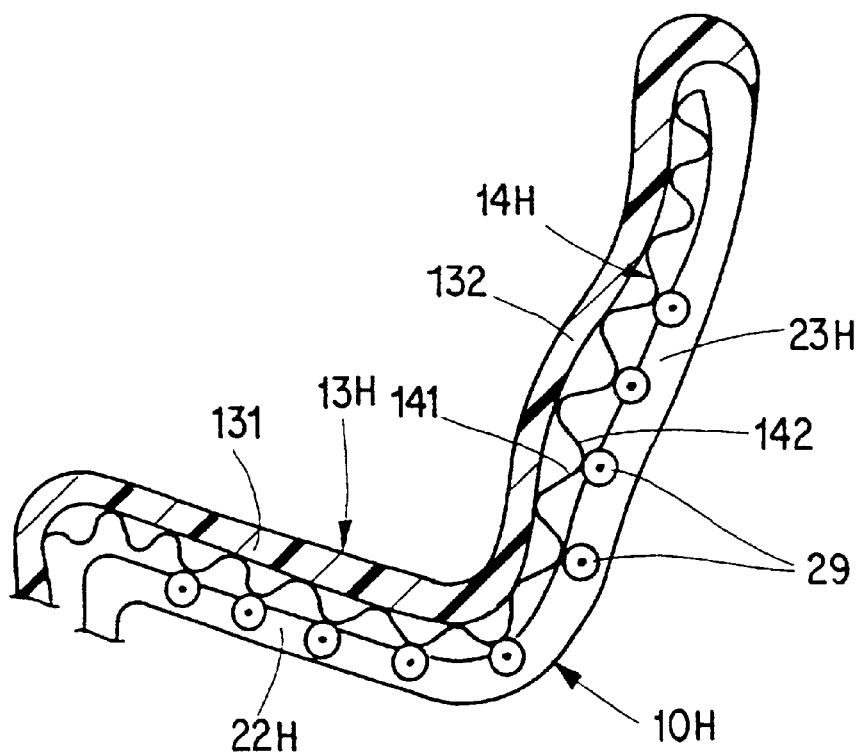

In the case of the vehicle seats schematically illustrated in longitudinal sectional views of FIGS. 10 and 11 which have a seat part and a backrest, a massaging device is provided instead of a seat depth adjusting device. As not illustrated here in detail, the corrugated spring plate 14G is suspended by means of its transversely extending end edges again on the forward cross strut of the seat frame 22G and on the upper transverse spar of the backrest frame 23G and is covered by the cushion. In FIG. 10, air hoses 28 are placed in the, viewed from the direction of the cushion 13G, wave troughs 141 of the corrugated spring plate 14G, which air hoses 28 are connected to a compressed-air device 40 for the selective individual adjusting of their air pressure. The variation of the air pressure permits a pressure point change and thus a massaging effect and influences the hardness of the seat.

The massaging effect in the embodiment of FIG. 11 is achieved by means of a plurality of eccentric rollers 29 which are rotatably arranged on the seat frame 22H and on the backrest frame 23H. In this case, each eccentric roller 29 is placed against a wave crest 142 of the corrugated spring plate 14. The individual eccentric rollers 29 are driven by means of a toothed belt not shown here. During the rotation of the eccentric rollers 29, these press upon the corrugated spring plate 14H and thereby increase or reduce the pressure point.

Figure 12:
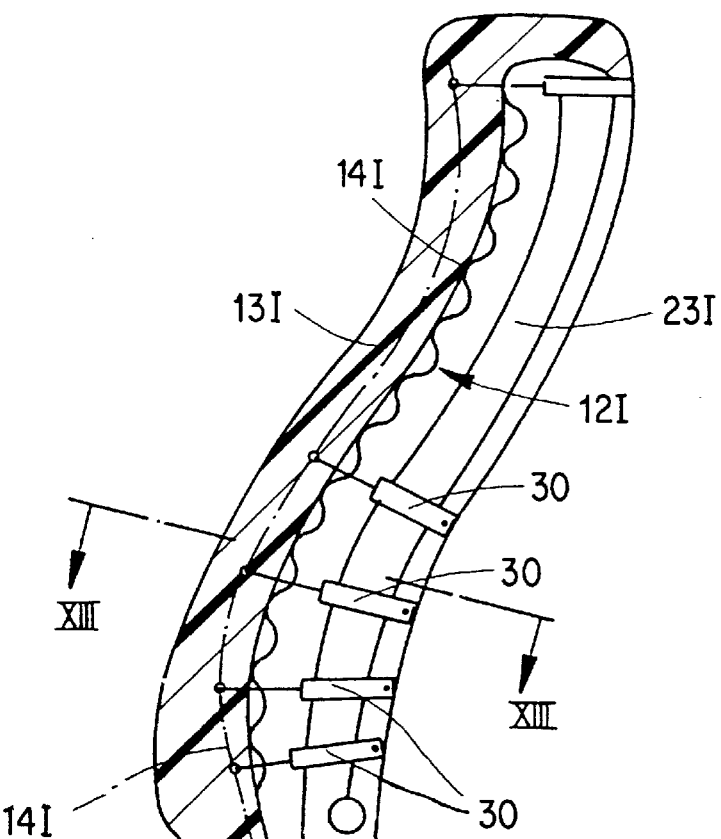
FIG. 12 is a schematic longitudinal sectional view of a backrest of a vehicle seat according to another embodiment of the invention.
Figure 13:
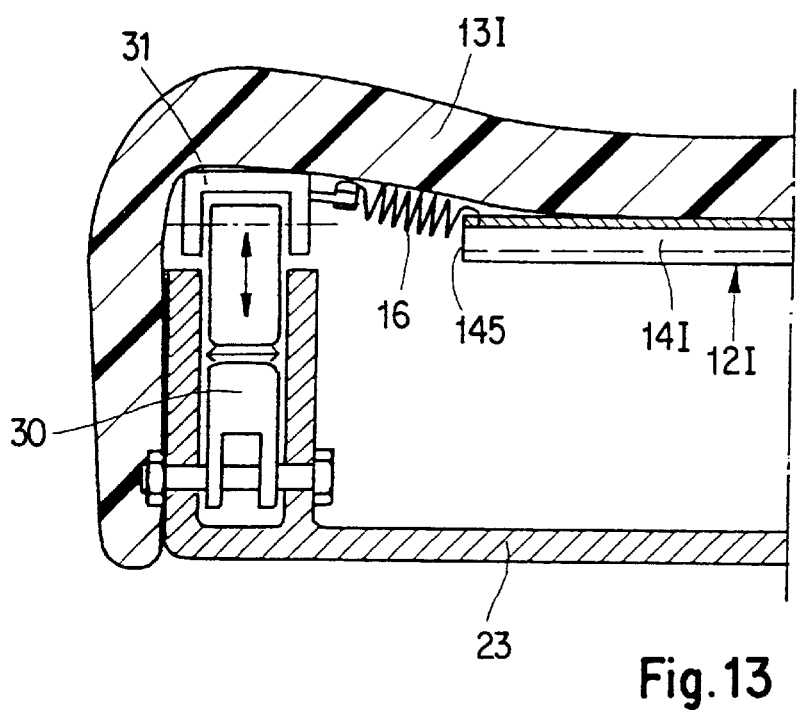
FIG. 13 is a schematic cutout of a section along Line XIII—XIII in FIG. 12.

FIGS. 12 and 13 schematically illustrate the backrest of another embodiment of a vehicle seat as a longitudinal sectional view (FIG. 12) and as a cross-sectional cutout (FIG. 13). A plurality of adjusting members 30 is arranged on the backrest frame 23I which are constructed to be displaceable in the sitting direction, thus in the direction of the seat depth, and are applied to the corrugated spring plate 14I. A cap 31 is firmly connected with each free end of an adjusting member 30, on which cap 31 a tension spring 16 is fixed which is suspended by means of its other end on the longitudinal edge 145 of the corrugated spring plate 14I. The corrugated spring plate 14I is therefore fastened along its two longitudinal edges 145 in the area of the backrest frame 23I by way of a plurality of tension springs 16 to a corresponding number of adjusting members 30. The adjusting members 30 may be pneumatically, electrically, hydraulically or mechanically driven, and thereby more or less advance from the backrest frame 23I. By means of their adjustment, an adjustment of the back support is possible, as indicated in FIG. 12 by the contour of the corrugated spring plate 14I illustrated by a dash-dotted line. The individual caps 31 on the adjusting members 30 can also be connected with one another in one piece and will then form a flexible adjusting frame which is displaceably fixed on the backrest frame 23 by way of the adjusting members 30.

Figure 14:
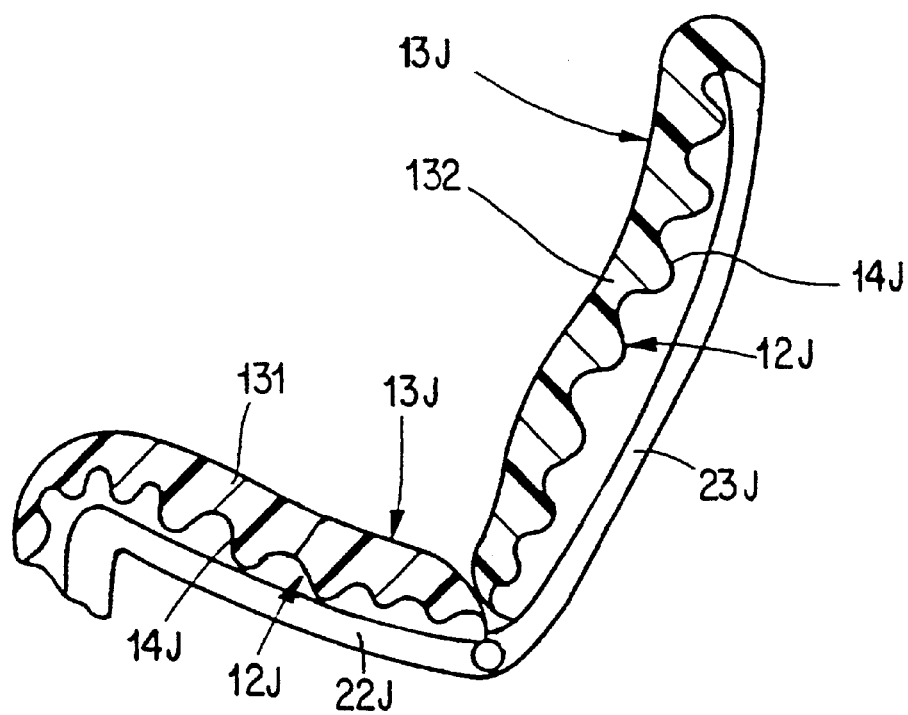
FIG. 14 is a schematic longitudinal sectional view of a seat according to another embodiment of the invention.

In the case of the seat schematically illustrated as a longitudinal sectional view in FIG. 14, the transversely stiff and longitudinally flexible base part 12J and the cushion 13J for the seat part and the backrest are constructed separately from one another, the corrugated spring part 14J in each case being separately fixed, as described, on the seat frame 22J and on the backrest frame 23J. The spring elements not shown here and the possible adjusting arrangement are to be provided in each case for the seat part and the backrest. The backrest frame 23J is swivellably held on the seat frame 22J and can be locked in any swivelling position so that the seat can also be used as a lying arrangement. In addition, the seat part and the backrest can be conceived such that the two base parts 12J with the seat cushion 131 and the backrest cushion 132 can easily be detached from the seat frame 22J and the backrest frame 23J and can be removed.

The invention is not limited to the above-described embodiment of a vehicle seat. In the case of a corresponding angle of slope between the seat part and the backrest, embodiments used for use as a lounger are also contemplated.

In addition to the above-described applications, the possibility of a design for a wheelchair should also be stressed. Such a wheelchair can then be held in a more stable manner; the patient can sit in it more firmly and securely, and orthopaedic correction pads can be used better and more safely and durably. By means of the adjusting mechanisms according to the invention, different sitting and lying positions can be adjusted. If the base part with the cushion is constructed to be removable from the frame, the wheelchair can also be constructed to be foldable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A resting arrangement for providing adaption to at least one of a sitting position and a lying position, having a stable subframe comprising a seat frame of a seat part and a backrest frame of a backrest connected therewith, and having a base part which has a transversely stiff and longitudinally flexible construction, wherein the base part is formed of a thin corrugated spring plate whose corrugations extend transversely and spaced from one another in a longitudinal corrugation direction of the seat, and which is suspended by means of a forward end edge, which extends transversely, on a forward cross strut of the seat frame and is suspended by means of a rearward end edge, which extends transversely, on an upper transverse spar of the backrest frame, and wherein a cushion rests on the corrugated spring plate, which cushion is divided into a section forming a seat cushion and into a section forming a backrest cushion.

2. Arrangement according to claim 1, wherein the seat cushion and backrest cushion are formed together in one piece.

3. Arrangement according to claim 2, wherein the subframe is constructed to be tiltable about a swivelling axis which extends transversely to the sitting direction.

4. Arrangement according to claim 3, wherein an adjusting arrangement is arranged on the seat frame which is applied to the corrugated spring plate for its longitudinal displacement in the corrugation direction.

5. Arrangement according to claim 4, wherein a driving roller is rotatably disposed close to the forward transverse strut of the seat frame, which driving roller extends transversely over the corrugated spring plate and engages by means of a cam profile adapted to a wave profile formed by the corrugations in the corrugated spring plate, and wherein the corrugated spring plate is partially guided around the driving roller and is braced by its transversely extending end edges by way of spring elements on the seat frame and on the backrest frame.

6. Arrangement according to claim 4, wherein the corrugated spring plate is divided between the seat frame and the backrest frame, and wherein the corrugated spring plate sections are each fixed separately in the seat frame and the backrest frame.

7. Arrangement according to claim 3, wherein the corrugated spring plate is fastened on the subframe by spring-elastic tension spring elements on its longitudinal edges extending in parallel to the corrugation direction.

8. Arrangement according to claim 2, wherein an adjusting arrangement is arranged on the seat frame which is applied to the corrugated spring plate for its longitudinal displacement in the corrugation direction.

9. Arrangement according to claim 2, wherein a plurality of eccentric rollers are rotatably arranged on the seat frame or backrest frame on the side of the corrugated spring plate facing away from the cushion, such that each eccentric roller, which extends transversely over the corrugated spring plate, rests on a wave crest, and wherein the eccentric rollers can be driven by way of a toothed belt.

10. Arrangement according to claim 2, wherein the corrugated spring plate is divided between the seat frame and the backrest frame, and wherein the corrugated spring plate sections are each fixed separately in the seat frame and the backrest frame.

11. Arrangement according to claim 1, wherein the subframe is constructed to be tiltable about a swivelling axis which extends transversely to the sitting direction.

12. Arrangement according to claim 1, wherein an adjusting arrangement is arranged on the seat frame which is applied to the corrugated spring plate for its longitudinal displacement in the corrugation direction.

13. Arrangement according to claim 12, wherein a driving roller is rotatably disposed close to the forward transverse strut of the seat frame, which driving roller extends transversely over the corrugated spring plate and engages by means of a cam profile adapted to a wave profile formed by the corrugations in the corrugated spring plate, and wherein the corrugated spring plate is partially guided around the driving roller and is braced by its transversely extending end edges by way of spring elements on the seat frame and on the backrest frame.

14. Arrangement according to claim 13, wherein the corrugated spring plate is fastened on the subframe by spring-elastic tension spring elements on its longitudinal edges extending in parallel to the corrugation direction.

15. Arrangement according to claim 13, wherein a plurality of eccentric rollers are rotatably arranged on the seat frame or backrest frame on the side of the corrugated spring plate facing away from the cushion, such that each eccentric roller, which extends transversely over the corrugated spring plate, rests on a wave crest, and wherein the eccentric rollers can be driven by way of a toothed belt.

16. Arrangement according to claim 13, wherein the corrugated spring plate is divided between the seat frame and the backrest frame, and wherein the corrugated spring plate sections are each fixed separately in the seat frame and the backrest frame.

17. Arrangement according to claim 12, wherein the corrugated spring plate is fastened on the subframe by means of spring-elastic tension spring elements on its longitudinal edges extending in parallel to the corrugation direction.

18. Arrangement according to claim 12, wherein a plurality of eccentric rollers are rotatably arranged on the seat frame or backrest frame on the side of the corrugated spring plate facing away from the cushion, such that each eccentric roller, which extends transversely over the corrugated spring plate, rests on a wave crest, and wherein the eccentric rollers can be driven by way of a toothed belt.

19. Arrangement according to claim 18, wherein in the area of the backrest frame, the fastening of the spring-elastic tension spring elements, takes place on a plurality of adjusting members held on the backrest frame, which adjusting members are constructed to be displaceable in the sitting direction.

20. Arrangement according to claim 1, wherein the corrugated spring plate is fastened on the subframe spring-elastic tension spring elements on its longitudinal edges extending in parallel to the corrugation direction.

21. Arrangement according to claim 20, wherein in the area of the backrest frame, the fastening of the spring-elastic tension spring elements, takes place on a plurality of adjusting members held on the backrest frame, which adjusting members are constructed to be displaceable in the sitting direction.

22. Arrangement according to claim 21, wherein the adjusting members can be driven pneumatically, electrically, hydraulically or mechanically.

23. Arrangement according to claim 21, wherein the corrugated spring plate is divided between the seat frame and the backrest frame, and wherein the corrugated spring plate sections are each fixed separately in the seat frame and the backrest frame.

24. Arrangement according to claim 20, wherein a plurality of eccentric rollers are rotatably arranged on the seat frame or backrest frame on the side of the corrugated spring plate facing away from the cushion, such that each eccentric roller, which extends transversely over the corrugated spring plate, rests on a wave crest, and wherein the eccentric rollers can be driven by way of a toothed belt.

25. Arrangement according to claim 20, wherein the corrugated spring plate is divided between the seat frame and the backrest frame, and wherein the corrugated spring plate sections are each fixed separately in the seat frame and the backrest frame.

26. Arrangement according to claim 1, wherein a wave profile formed by corrugations in the corrugated spring plate has one of a rectangular, triangular and sinusoidal construction.

27. Arrangement according to claim 1, wherein a corrugation with a significantly smaller wave period is superimposed on the corrugation of the corrugated spring plate.

28. Arrangement according claim 1, wherein air-filled hoses are placed in wave troughs formed by corrugations in the corrugated spring plate viewed from the direction of the cushion.

29. Arrangement according to claim 28, wherein the air-filled hoses are connected to a compressed air device for the selective individual adjusting of their air pressure.

30. Arrangement according to claim 1, wherein a plurality of eccentric rollers are rotatably arranged on the seat frame or backrest frame on the side of the corrugated spring plate facing away from the cushion, such that each eccentric roller, which extends transversely over the corrugated spring plate, rests on a wave crest, and wherein the eccentric rollers can be driven by way of a toothed belt.

31. Arrangement according to claim 30, wherein the corrugated spring plate is divided between the seat frame and the backrest frame, and wherein the corrugated spring plate sections are each fixed separately in the seat frame and the backrest frame.

32. Arrangement according to claim 1, wherein the corrugated spring plate is divided between the seat frame and the backrest frame, and wherein the corrugated spring plate sections are each fixed separately in the seat frame and the backrest frame.

33. A human support arrangement comprising:

a stable subframe formed of a seat frame and a backrest frame connected with the seat frame, a base part supported on the seat frame and backrest frame, said base part being formed of a thin corrugated spring plate with corrugation ribs extending transversely of the subframe and spaced longitudinally of the subframe to thereby provide a transversely stiff and longitudinally flexible base part, said corrugated spring plate being suspended at one end, on an upper transverse spar of the backrest frame and at another end, on a forward end of the seat frame, and a cushion supported by the base part and including a backrest cushion section and a seat cushion section.

34. Arrangement according to claim 33, wherein the seat cushion and backrest cushion are formed in one piece, and wherein said corrugated spring plate is embedded in the seat cushion and backrest cushion.

35. Arrangement according to claim 34, wherein the seat frame and backrest are pivotal with respect to one another to accommodate movement between a sitting and reclining position of the cushion and base part.

36. Arrangement according to claim 33, wherein the corrugated spring plate is divided between the seat frame and the backrest frame, and wherein the corrugated spring plate sections are each fixed separately in the seat frame and the backrest frame.

* * * * *